US012757057B2

(12) United States Patent
Greenidge et al.

(10) Patent No.: US 12,757,057 B2
(45) **Date of Patent: *Oct. 6, 2026**

(54) DELTA CODING FOR REMOTE SENSING

(71) Applicant: Viasat, Inc., Carlsbad, CA (US)

(72) Inventors: David D. Greenidge, Longmont, CO (US); Steve Chacko, San Rafael, CA (US)

(73) Assignee: Viasat, Inc., Carlsbad, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/910,992

(22) Filed: Oct. 9, 2024

(65) Prior Publication Data

US 2025/0039721 A1 Jan. 30, 2025

Related U.S. Application Data

(63) Continuation of application No. 17/429,165, filed as application No. PCT/US2020/017536 on Feb. 10, 2020, now Pat. No. 12,212,993.

(Continued)

(51) Int. Cl.
*H04W 24/10* (2009.01)
*G01C 11/06* (2006.01)

(Continued)

(52) U.S. Cl.
CPC ............ *H04W 24/10* (2013.01); *G01C 11/06* (2013.01); *G06V 20/13* (2022.01);

(Continued)

(58) Field of Classification Search
CPC ....... H04W 24/10; G06V 20/13; G01C 11/06; G06T 2207/10032; H04B 7/18513; H04B 7/18515; H04B 7/19; H04B 17/391
See application file for complete search history.

(56) References Cited

U.S. PATENT DOCUMENTS 6,064,337 A 5/2000 Hirosawa
9,389,084 B1 7/2016 Chen et al.

(Continued)

FOREIGN PATENT DOCUMENTS

CN 108428220 A 8/2018
CN 105245451 A 10/2018

(Continued)

*Primary Examiner* — Mohamed A. Wasel
(74) *Attorney, Agent, or Firm* — Holland & Hart LLP

(57) ABSTRACT

A system supporting remote sensing of information may include a processing capability configured for determining differences between the sensed information and a baseline condition, such as a base map of information. The determined differences from the baseline condition may be communicated over communication link (e.g., a wireless communication link, a satellite communication link), which may be referred to as or be otherwise associated with a "delta coding" of information sensed by the remote sensor system. In some examples, delta coding may support a smaller transfer of information over a communication link than communicating an entirety of sensed information. By communicating such difference information, the remote sensor system may accordingly support updating information more efficiently, more frequently, more rapidly, or more reliably, among other benefits.

18 Claims, 8 Drawing Sheets

Related U.S. Application Data

(60) Provisional application No. 62/803,778, filed on Feb. 11, 2019.

(51) Int. Cl.

| | |
|---|---|
| ***G06V 20/13*** | (2022.01) |
| ***H04B 7/185*** | (2006.01) |
| ***H04B 7/19*** | (2006.01) |
| ***H04B 17/391*** | (2015.01) |

(52) U.S. Cl.
CPC ..... *H04B 7/18513* (2013.01); *H04B 7/18515* (2013.01); *H04B 7/19* (2013.01); *H04B 17/391* (2015.01); *G06T 2207/10032* (2013.01)

(56) References Cited

U.S. PATENT DOCUMENTS

| | | | | |
|---|---|---|---|---|
| 10,339,646 | B1 | 7/2019 | Adler | |
| 10,366,288 | B1 | 7/2019 | Kottenstette et al. | |
| 2006/0012277 | A1 | 1/2006 | Park et al. | |
| 2006/0080037 | A1* | 4/2006 | Borg | G01C 11/00 709/201 |
| 2007/0002559 | A1 | 1/2007 | Uke | |
| 2012/0328161 | A1* | 12/2012 | Palenychka | G06V 20/52 382/107 |
| 2013/0022666 | A1 | 1/2013 | Brzezinska | |
| 2015/0021186 | A1 | 1/2015 | Howell, Jr. | |
| 2015/0211864 | A1* | 7/2015 | Carr | G01C 21/005 701/519 |
| 2017/0184393 | A1* | 6/2017 | Chen | G06T 7/62 |
| 2018/0030822 | A1 | 2/2018 | Ferguson et al. | |
| 2018/0308226 | A1* | 10/2018 | Kim | B64G 1/242 |
| 2019/0005062 | A1 | 1/2019 | Joneja | |
| 2019/0013064 | A1 | 1/2019 | Shah et al. | |
| 2019/0028183 | A1 | 1/2019 | Coleman et al. | |

FOREIGN PATENT DOCUMENTS

| | | | |
|---|---|---|---|
| JP | H0482329 | A | 3/1999 |
| JP | 2006027700 | A | 10/2006 |
| KR | 20050021210 | A | 3/2005 |
| RU | 2016101046 | A | 8/2017 |
| RU | 2646370 | C1 | 3/2018 |
| WO | 2016166257 | A1 | 10/2016 |

* cited by examiner

DELTA CODING FOR REMOTE SENSING

CROSS REFERENCE TO RELATED APPLICATIONS

The present application for patent is a continuation of U.S. patent application Ser. No. 17/429,165 by Greenidge et al., entitled "DELTA CODING FOR REMOTE SENSING," filed Aug. 6, 2021, which is a 371 national phase filing of International Patent Application No. PCT/US2020/017536 by Greenidge et al., entitled "DELTA CODING FOR REMOTE SENSING," filed Feb. 10, 2020, which claims the benefit of U.S. Provisional Patent Application No. 62/803,778 by Greenidge et al., entitled "DELTA ENCODING FOR LEO REMOTE EARTH SENSING," filed Feb. 11, 2019, each of which is assigned to the assignee hereof, and each of which is expressly incorporated by reference in its entirety herein.

BACKGROUND

The following relates generally to remote sensor systems, including techniques for delta coding for remote sensing.

Remote sensor systems may provide various platforms for sensing information, which may be associated with a geographical distribution of information. In some cases, remote sensor systems may communicate sensed information wirelessly to one or more other devices. For example, a remote sensor system may be included in a satellite of a satellite communications system, and sensed information may be communicated via a return link to a ground segment of the satellite communications system. Communication of sensed information may be limited by an availability or cost of the return link, which may be based on a capacity of the return link, or other information that may be occupying the return link, or an absence of a return link due to intermittent connectivity, among other factors.

SUMMARY

The described techniques relate to improved methods, systems, devices, and apparatuses that support delta coding for remote sensing. In some examples, a remote sensor system may communicate sensed information using a communication link with another device (e.g., a wireless communication link, a satellite communication link), where such a communication link may be associated with limitations such as limited capacity or bandwidth, limited availability, limited reliability, or other considerations. In accordance with examples as disclosed herein, a system that supports a remote sensing of information may include a processing capability configured for determining differences between sensed information and a baseline condition, such as a base map of information having an initial geographical distribution of information. The determined differences from the baseline condition may be communicated over a communication link, which may be referred to as or be otherwise associated with a "delta coding" of information sensed by the remote sensor system. In some examples, the described techniques for delta coding may support a smaller transfer of information over a communication link than communicating an entirety of sensed information. By communicating such difference information, the remote sensor system may accordingly support updating information (e.g., updating a geographical distribution of information) more efficiently, more frequently, more rapidly, or more reliably, among other benefits.

DETAILED DESCRIPTION

Figure 1:
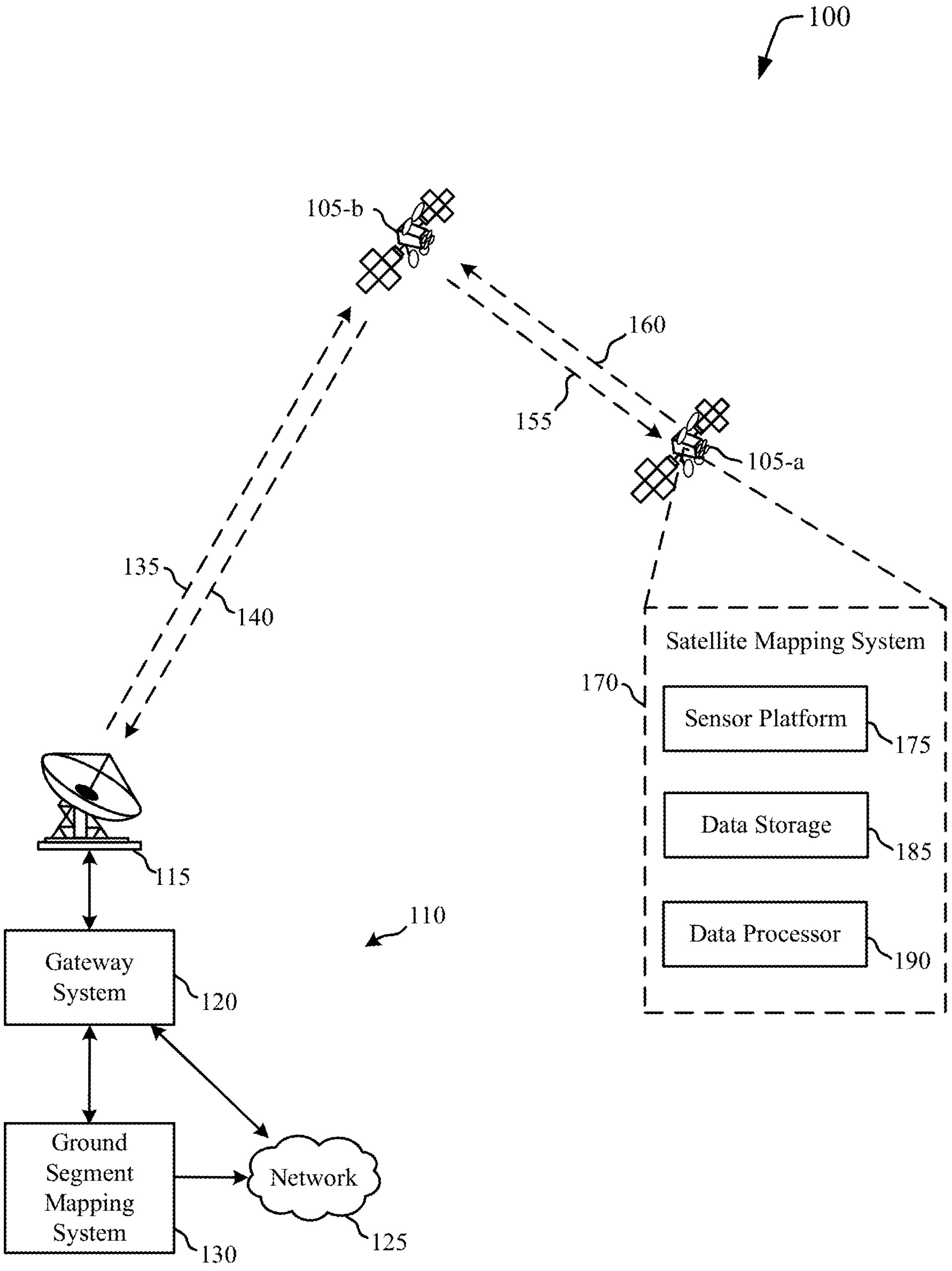
FIG. 1 illustrates an example of a satellite communications system that supports delta coding for remote sensing in accordance with examples as disclosed herein.

A system in accordance with the techniques described herein may support delta coding of information sensed by a first device of the system, which may improve communications related to the sensed information between the first device of the system and another device of the system. For example, a remote sensor system may be employed for communicating a spatial distribution of sensed information using a communication link (e.g., a wireless communication link, a satellite communication link) with another device, where such a communication link may be associated with limitations such as limited capacity, limited availability, limited reliability, or other considerations. In accordance with examples as disclosed herein, a remote sensor system may include a processing capability configured for determining differences between sensed information and a baseline condition, such as a base map of information. The determined differences from the baseline condition, which may be referred to as or be otherwise associated with a "delta coding" of information sensed by the remote sensor system, may be communicated over a communication link. In some examples, delta coding may support a smaller transfer of information over a communication link than communicating an entirety of sensed information. By communicating such difference information, the remote sensor system may accordingly support updating information (e.g., updating a spatial distribution of information) more efficiently, more frequently, more rapidly, more reliably, or according to priorities of differences, among other benefits.

One example of the described techniques for delta coding may refer to a delta coding of a spatial distribution (e.g., a geographical distribution) of information gathered by a remote sensor platform of a satellite. For example, the satellite may receive a base map (e.g., via a forward link from a ground segment) having a first spatial distribution of information, and the remote sensor platform of the satellite may be used for determining a second spatial distribution of information. A processing capability of the satellite may be configured for determining difference information representing a difference between the first spatial distribution of information and the second spatial distribution of information. The satellite may be configured to transmit the difference information to a ground segment (e.g., via a return link), which may provide favorable communications performance as compared to transmitting the second spatial distribution of information in its entirety. For example, communicating the difference information may reduce a utilization of a communication link (e.g., a return link), which may support other communications using the communication link, or an increased fidelity of sensed information being transferred using the communication link, or completing an information update before a loss of the communication link (e.g., due to a loss of line-of-sight between an orbital path of the satellite and the ground segment), among other benefits.

This description provides various examples of techniques for delta coding to support remote sensing, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 illustrates an example of a satellite communications system 100 that supports delta coding for remote sensing in accordance with examples as disclosed herein. The example of satellite communications system 100 includes a first satellite 105-*a* that includes a satellite mapping system 170. The example of satellite communications system 100 also includes a ground segment 110 that may include one or more of a ground segment antenna 115, a gateway system 120, a network 125, and a ground segment mapping system 130. The ground segment mapping system 130 and the satellite mapping system 170 may be configured to support various operations for collection, processing, and communication of information, such as geographical distributions of information.

In some examples, the satellite communications system 100 may include a second satellite 105-*b* that supports a communications relay capability between the first satellite 105-*a* and the ground segment 110 (e.g., supporting a communication link between the first satellite 105-*a* and the ground segment 110, where the second satellite 105-*b* is an example of a relay device). For example, the second satellite 105-*b* may receive forward link ground segment transmissions 135 (e.g., from ground segment antenna 115) and forward at least a portion of the received signals, or transmit signals that are otherwise based at least in part on the forward link ground segment transmissions 135, as forward link relay transmissions 155. Additionally or alternatively, the second satellite 105-*b* may receive return link satellite transmissions 160 (e.g., from the first satellite 105-*a*) and forward at least a portion of the received signals, or transmit signals that are otherwise based at least in part on the return link satellite transmissions 160, as return link relay transmissions 140. However, in other examples in accordance with the described techniques, a second satellite 105-*b* may be omitted, and a communication link may be supported between a satellite 105 (e.g., a satellite associated with a satellite mapping system 170) and a gateway system 120 (e.g., associated with a ground segment mapping system 130) without a relay by another satellite 105 or other device. Moreover, some systems in accordance with the described techniques may include multiple relay devices, such as two or more relay satellites between a first satellite 105-*a* and a ground segment 110.

Satellite communications system 100 may include any suitable type of satellite system, including a geostationary orbit (GEO) satellite system, a medium earth orbit (MEO) satellite system, or a low earth orbit (LEO) satellite system, or various combinations thereof. In some examples, the first satellite 105-*a* (e.g., associated with a satellite mapping system 170) may be configured in a LEO or MEO, and the second satellite 105-*b* (e.g., a relay satellite) may be configured in a geostationary orbit. In some cases, such a configuration may be employed to combine relatively broader sensing coverage of the first satellite 105-*a* (e.g., due to a path of a LEO or MEO supporting overhead passes across a broader range of ground positions or within a closer proximity to ground positions) with relatively consistent communications coverage via the second satellite 105-*b* (e.g., due to relatively stable orientation or line-of-sight between the second satellite 105-*b* and the ground segment antenna 115, relatively longer or more-frequent line-of-sight between the first satellite 105-*a* and the second satellite 105-*b* than a line-of-sight between the first satellite 105-*a* and a ground segment, such as ground segment 110 or ground segment antenna 115). In some examples, the second satellite 105-*b* may be a GEO satellite configured with asymmetric communication throughput between a forward link and a return link. For example, the second satellite 105-*b* may have substantially more bandwidth allocated for a forward link than for a return link, or may have a higher spectral efficiency for a forward link. In some examples, such a configuration may be related to the relatively large or higher capacity ground segment antenna 115, or power or beamforming capabilities of the second satellite 105-*b*.

Gateway system 120 may be a device or system that provides an interface between network 125 and a satellite 105. In some examples, the gateway system 120 may be referred to as a hub or ground station. Gateway system 120 may use ground segment antenna 115 to transmit signals to and receive signals from a satellite 105 via a gateway uplink (e.g., via forward link ground segment transmissions 135) and a gateway downlink (e.g., via return link relay transmissions 140). Ground segment antenna 115 may be two-way capable and designed with adequate transmit power and receive sensitivity to communicate reliably with one or more satellites 105.

The gateway system 120 may be connected with a network 125 via one or more wired or wireless links. In some cases, the gateway system 120 may be configured to communicate with the first satellite 105-*a* via the second satellite 105-*b*. Network 125 may include any suitable public or private networks and may be connected to other communications networks (not shown) such as the Internet, telephony networks (e.g., Public Switched Telephone Network (PSTN), etc.), and the like. Network 125 may connect gateway system 120 with other gateway systems, which may also be in communication with a satellite 105 (e.g., a first satellite 105-*a*, a second satellite 105-*b*, other satellites 105). Alternatively, separate network linking gateways and other nodes may be employed to cooperatively service various communications.

Satellite communications system 100 may operate in one or more of the International Telecommunications Union (ITU) Ku-band, K-band, or Ka-band (e.g., from 17.7 to 21.2 Giga-Hertz (GHz) in the downlink and 27.5 to 31 GHz in the uplink portion of the Ka-band). Alternatively, satellite communications system 100 may operate in other frequency bands such as C-band, X-band, S-band, L-band, and the like. In some examples, the ground segment antenna 115 or a satellite 105 may be configured to transmit or receive signals within one or more specified frequency bands, one or more specific polarizations, or both. In various examples, communications between a ground segment 110 and a second satellite 105-*b* may be configured over a same frequency or frequency band as communications between a second satellite 105-*b* and a first satellite 105-*a*, configured over a different frequency or frequency band as communications between a second satellite 105-*b* and a first satellite 105-*a*, or both.

The satellite mapping system 170 may be an example of a remote sensing system, or portion thereof, configured to gather a geographical or otherwise spatial distribution of information. For example, the satellite mapping system 170 may include a sensor platform 175, which may include one or more sensors for detecting various conditions or phenomena. The sensor platform may include one or more sensors configured for sensing information in a visible spectrum, an IR spectrum, a thermal spectrum, or an electromagnetic spectrum, or may include one or more sensors associated with hyperspectral imaging, radar imaging, synthetic aperture radar imaging, or other information. Such information may be gathered by the sensor platform 175 according to a spatial or geographical distribution, such as a two-dimensional distribution, a two-dimensional distribution overlaid on an elevation profile, a three-dimensional distribution, and other distributions.

The satellite mapping system 170 also includes a data processor 190 that may be configured for various aspects of information processing. For example, the data processor 190 may be configured for processing information sensed by the sensor platform 175, such as object identification, boundary identification, water or other material detection, spatial filtering, or atmospheric rejection (e.g., for discarding cloud cover, smoke, or pollution). In some examples, the data processor 190 may be configured to perform operations associated with ray tracing, such as adjusting visible spectrum imaging according to a known position of the sun or other considerations (e.g., time of day), operations associated with compensating for atmospheric conditions such as cloud cover, or operations associated with adapting information to different observation orientations or perspective (e.g., for generating or adapting a base map, for processing sensed information for a comparison with a base map). The satellite mapping system also includes data storage 185, which may be configured for storing raw information (e.g., from the sensor platform 175), base maps (e.g., received at the first satellite 105-*a*), processed information (e.g., as processed by the data processor 190), and other information (e.g., configuration information).

Some examples of remote sensing systems may be configured to collect as much data as possible, and forward such data to another device for various processing operations. For example, some satellite sensor systems may be configured without certain processing capabilities (e.g., due to cost, complexity, or other challenges associated with locating such capabilities in an orbital vehicle), and may instead be configured to transmit sensed data to a ground segment, such as ground segment 110. Thus, in some satellite sensor systems, communications may be configured to be asymmetrical, with a relatively low-capacity command channel or telemetry channel (e.g., on the order of kilobits per second), and a relatively high capacity data channel (e.g., downlink channel, return channel).

In one example of such a satellite sensor system, a satellite may be configured to store data in data storage of the satellite until performing a concentrated downlink data burst. For example, to support a LEO or MEO sensor satellite, a concentrated downlink data burst may be performed once per orbit, such as a data burst communicated to an Earth station at a polar location. In such examples, information processing may be located in a ground segment, and latency of such processing may include orbit time of the satellite sensor system. In another example, data may be relayed via a GEO satellite (e.g., via second satellite 105-*b*) with a capacity asymmetry associated with relatively lower return link capacity (e.g., relatively lower capacity communications from the second satellite 105-*b* to the ground segment 110). In either case, it may be preferable to reduce an amount of information conveyed via a return link to better utilize available communications resources.

In some examples, the described techniques for delta coding may be implemented in a remote sensing system (e.g., one or more portions of the satellite communications system 100) to improve various aspects of communicating sensed information. For example, delta coding may be implemented as a data handling paradigm for LEO or MEO remote sensing satellites that maximizes communication resources and leverages on-board processing (e.g., at the first satellite 105-*a*) for object-based image or otherwise spatial analysis. Such techniques may be leveraged to provide real-time geospatial information efficiently at a cadence not possible with some concepts of operation.

The described techniques for delta coding may be associated with a base map, or other baseline condition from which differences may be determined (e.g., by the data processor 190). In various examples, such a base map may be pre-loaded at the first satellite 105-*a*, loaded to first satellite 105-*a* based in information from other satellites, or loaded based on information gathered at the first satellite 105-*a* (e.g., based on information sensed by the sensor platform 175, or as returned to the first satellite 105-*a* after processing at the ground segment 110). In some examples, a base map may be referred to as a ground truth, or other baseline condition maintained by the ground segment 110. One or more base maps may be stored at the first satellite 105-*a* (e.g., in data storage 185).

A base map may be received at the first satellite 105-*a* via various communications. For example, a base map may be received at the first satellite 105-*a* directly from the ground segment 110, or via the second satellite 105-*b* (e.g., a relay satellite). In some examples, a base map may be updated over time (e.g., by information sensed by the sensor platform 175, by information from other satellites, by information processed at the ground segment 110), and the first satellite 105-*a* may store various base maps (e.g., over time) that are associated with one or more ground positions.

In some examples, a received or stored base map may refer to processed information that itself represents a spatial distribution of information that is suitable for comparison with sensed data from a particular location. In some examples, the first satellite 105-*a* (e.g., the satellite mapping system 170) may receive raw data and process the raw data into another form that is suitable for such comparisons (e.g., for detecting certain types of differences). In some examples, a base map may be associated with a specific field of interest, which may be a repeated field of interest that is passed by the first satellite 105-*a* over multiple orbital passes. In some examples, a base map may not refer to a complete or continuous spatial distribution, but may instead refer to an object catalog and locators (e.g., identifiers and coordinates).

The data processor 190 may perform various operations to support the described techniques for delta coding. For example, the data processor 190 may be configured to perform sensor frame normalization, geolocation and frame registration, orthorectification, georectification, or scene segmentation. In some examples, the data processor 190 may be configured to perform feature extraction, object analysis, or catalog lookup. The data processor 190 may also be configured to perform various aspects of difference determination, such as generating a scene delta, or identifying various changes in identified objects relative to a baseline condition. Thus, the data processor 190 may perform operations configured to enable transmitting some portion of the information sensed by the sensor platform 175, rather than all of the information sensed by the sensor platform 175, which may streamline various communications performed by the first satellite 105-*a*.

In some examples of delta coding, the satellite mapping system 170 may be configured to continuously process sensor data and form differences from Last Known State (LKT) algorithm, which may support near real-time latency. Information communicated by the first satellite 105-*a* (e.g., to the ground segment 110) may be some fraction of the sensed information, and information communicated to the first satellite 105-*a* may be related to LKT information that is continuously updated (e.g., a continuously updated ground truth). In some examples, the first satellite 105-*a* may be specifically configured for certain types of difference determinations, and delta algorithms or other difference determination configuration may be provided to the first satellite 105-*a* (e.g., from the ground segment 110) via an uplink or forward link. For example, the satellite communications system 100 may support a reprogrammable mission definition of the first satellite 105-*a* enabled by two-way link between the first satellite 105-*a* and the ground segment, which may support uploading new base maps or object catalogs. In some examples, the first satellite 105-*a* may be commanded to a particular area, and the first satellite 105-*a* may request a base map from ground infrastructure, or retrieve relevant algorithms.

The determination of difference information may be performed by the satellite mapping system 170 according to various techniques. For example, differences may be determined based on raw information as sensed (e.g., by the sensor platform 175), or based on processed information such as differences in object detection (e.g., identifying objects not previously present, identifying objects no longer present, identifying movement or migration of known objects). Such determinations may be repeated at different orbital positions, which may or may not correspond to same surface locations. In some cases, a relatively large detected difference may be used to trigger an operation that communicates an entire set of information, or a relatively higher-fidelity set of information. In some cases, the satellite mapping system 170 may be configured to communicate difference information in patches, such as when obscuring adversely affects sensed information. According to these and other techniques, the satellite communications system 100 may be configured to support constantly refreshing actionable information.

In some examples, a determination of difference information may refer to various aspects of image analysis, which may be performed by various components of the satellite communications system 100. For example, the determination of difference information may refer to image processing performed entirely by the satellite mapping system 170, and the first satellite 105-*a* may send delta information directly to the ground segment 110 or to the ground segment 110 via the second satellite 105-*b* (e.g., a GEO satellite). In some examples, the second satellite 105-*b* may support a backhaul functionality, where such image processing or analysis may be performed entirely at the second satellite 105-*b*. In some examples, such image processing may be distributed, such as distributed between the first satellite 105-*a* and the ground segment 110, between the first satellite 105-*a* and the second satellite 105-*b*, between the first satellite 105-*a*, the second satellite 105-*b*, and the ground segment 110, or between the second satellite 105-*b* and the ground segment 110. In some examples, such processing may be flexible (e.g., between the first satellite 105-*a*, the second satellite 105-*b*, and the ground segment 110), which may support flexible allocation of resources on a forward link or return link (e.g., to first satellite 105-*a*).

The transmission of difference information may also be supported by the satellite communications system 100 according to various techniques. In some examples, difference information may be transmitted directly from the first satellite 105-*a* to the ground segment 110. In some examples, difference information may be communicated from the first satellite 105-*a* to the ground segment 110 via one or more relay devices (e.g., the second satellite 105-*b*), such as a geostationary relay, a LEO relay, or a MEO relay. In some examples, scheduling the transmission of difference information may be performed by one or more of the first satellite 105-*a* or the ground segment 110. For example, the scheduling of such transmissions may be based at least in part on channel conditions of a communication link, a cost of bandwidth, a quantity of data, a temporal value or priority of the data, or the presence or absence of other communications (e.g., an available bandwidth of a communications link). In some examples, such scheduling may be based at least in part on a priority of differences that have been identified, which may support an ability to rapidly take action on higher-priority differences.

Figure 2:
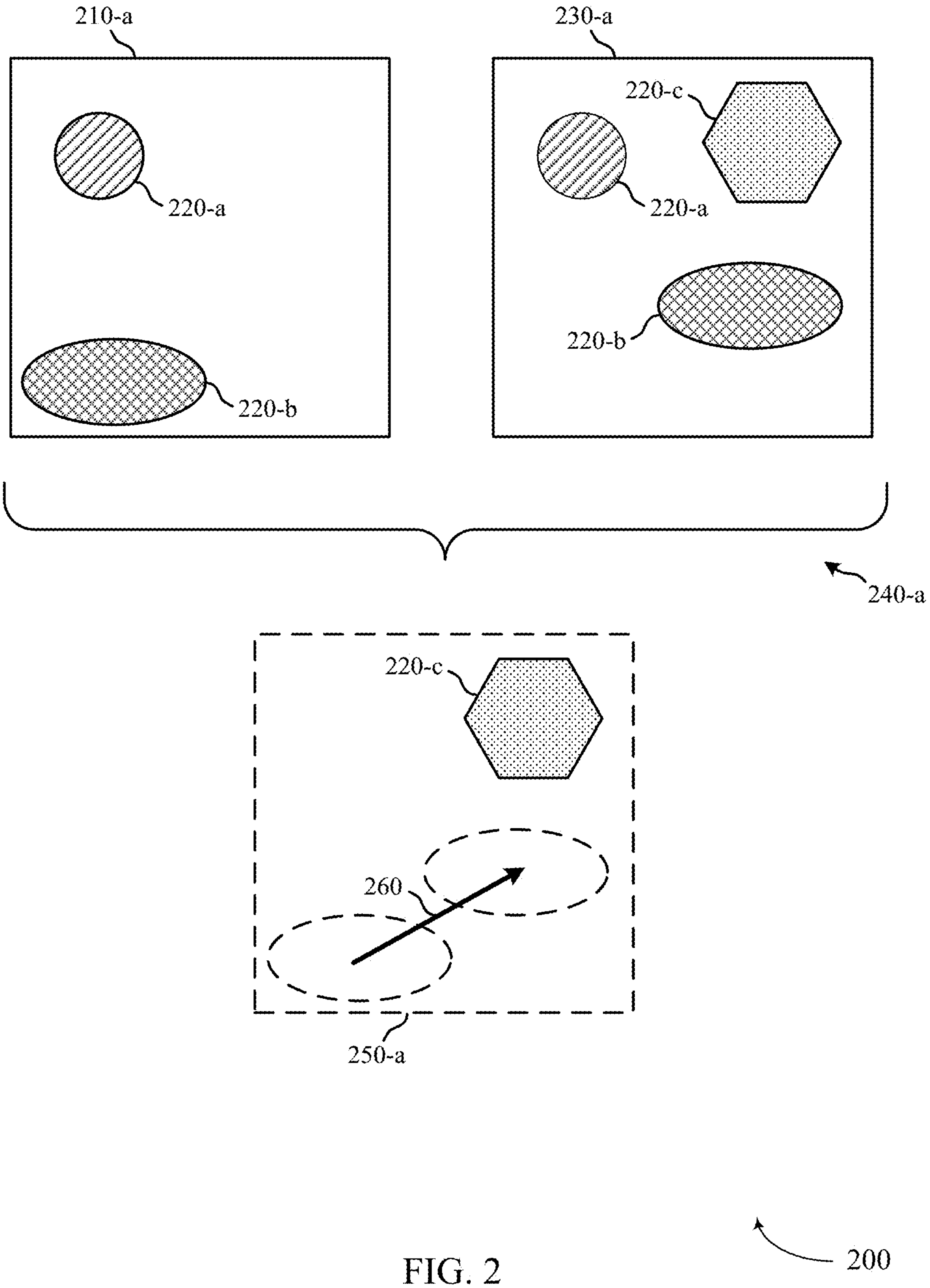
FIGS. 2 and 3 illustrate examples of difference determination that support delta coding for remote sensing in accordance with examples as disclosed herein.

It should be appreciated by a person skilled in the art that one or more aspects of the disclosure may be implemented in a satellite communications system 100, or other communications system or information system, to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims. FIG. 2 illustrates an example 200 of a difference determination that supports delta coding for remote sensing in accordance with examples as disclosed herein. In some examples, aspects of the difference determination of example 200 may be performed by a satellite mapping system 170 of a first satellite 105-*a* as described with reference to FIG. 1. In some examples, aspects of the difference determination of example 200 may be performed by a different device or type of device, which may be described more generally as a remote sensing system.

Example 200 includes a base map 210-*a*, including a first geographical distribution of information, which may be received by the first satellite 105-*a* or other remote sensing system and stored (e.g., at data storage 185) for later comparison. The base map 210-*a* may be one example of a baseline condition from which a difference determination may be made (e.g., by a first satellite 105-*a* or other device). The information of the base map 210-*a* may be associated with one or both of a ground position (e.g., a ground-referenced location at or above ground-level) or an overhead position (e.g., a position of an overhead pass above a ground position, a position of an orbital path of the first satellite 105-*a*). The information of the base map 210-*a* may include information of various types. In some examples, the base map 210-*a* may refer to imaging information, such as visible spectrum imaging, infra-red imaging, thermal imaging, hyperspectral imaging, synthetic aperture radar imaging, other types of imaging, or combinations thereof. In some examples, the information of the base map 210-*a* may include other types of information, such as atmospheric compositional information, ground-level compositional information, or other spatial or geographical distributions of information. The base map 210-*a* may be described as a spatial representation of information, such as an image or plot.

In some examples, the type of information of the base map 210-*a* may correspond to a type of information gathered by a sensor platform. For example, the base map 210-*a* may include visible-spectrum imaging information as collected by a visible-spectrum sensor of the remote sensing system. In some examples, the type of information of the base map 210-*a* may represent information that has been processed, filtered, or otherwise converted. For example, the base map may include regions of demarcation where a sensed characteristic, or multiple sensed characteristics, is above or below a threshold, or where combinations of sensed characteristics meet or do not meet an identification criteria, among other types of demarcation. In some examples, the base map 210-*a* may be based at least in part on processing information (e.g., images) gathered at different locations and mapped to a known elevation model (e.g., using orthorectification), or otherwise skewed or adapted (e.g., based on sensor frame normalization, based on ray tracing, based on time of day, compensated for cloud cover) to represent a perspective from which a comparison is to be made (e.g., to determine difference information).

The base map 210-*a* may be an example of a first geographical or spatial distribution of information from which various differences may be determined. For example, the base map 210-*a* may include a first feature 220-*a* and a second feature 220-*b*. In some examples, features 220 may refer to image information (e.g., regions of a certain color or color range, regions of a certain spectral wavelength or amplitude), distributions of another sensed characteristic (e.g., thermal distributions, distributions of atmospheric constituents), or identified features, such as vegetation (e.g., tree cover, agricultural regions, population regions), infrastructure (e.g., roads, bridges, train tracks), vehicles, or other features. The base map 210-*a* may be provided to a first satellite 105-*a* or other remote sensing system and, after sensing another geographical distribution of information (e.g., in a subsequent overhead or orbital pass), or sensing information that can be otherwise converted into another geographical distribution of information, the base map 210-*a* may be used to determine difference information (e.g., at the first satellite 105-*a* or other remote sensing system, by a satellite mapping system 170).

Example 200 also includes a sensed map 230-*a*, which includes a second geographical of spatial distribution of information that is based at least in part on information sensed by the remote sensor system (e.g., sensed by a sensor platform 175 of the first satellite 105-*a* or other remote sensing system). The information of the sensed map 230-*a* may also be associated with one or both of a ground position (e.g., a ground-referenced location at or above ground-level) or an overhead position (e.g., a position of an orbital or otherwise overhead pass above a ground position, a position of the sensor platform during collection of the information used to generate the sensed map 230-*a*). The ground position of the sensed map 230-*a* may generally correspond to the same ground position as the base map 210-*a*. However, the overhead position associated with the sensed map 230-*a* may be the same as the overhead position associated with the base map 210-*a* or may be different than the overhead position associated with the base map 210-*a*.

When the overhead position associated with the sensed map 230-*a* is different than the overhead position associated with the base map 210-*a*, the sensed map may include information that has been scaled, projected, or otherwise modified to support a comparison with the base map 210-*a*. For example, the sensed map 230-*a* may be generated based at least in part on modifying one or more images to represent a perspective of the base map 210-*a* (e.g., based on an elevation model an associated geographical region, based on a skew or perspective angle or orientation between an overhead position and a ground position). Additionally or alternatively, the base map 210-*a* may be generated based at least in part on modifying one or more images to represent a perspective of the sensed map 230-*a* (e.g., based on an elevation model of an associated geographical region, based on a skew or perspective angle or orientation between an overhead position and a ground position). More generally, information associated with a base map 210-*a*, or information associated with a sensed map 230-*a*, or both may be processed or modified according to a common perspective to facilitate comparisons and difference determinations.

In example 200, the sensed map 230-*a* includes the first feature 220-*a* at the same location, the second feature 220-*b* at a different location, and also a new feature 220-*c* that is not included in the base map 210-*a*. Accordingly, aspects of the features 220-*b* and 220-*c* of the sensed map 230-*a* may be illustrative of a change in a geographical or spatial distribution of information for a given ground position or ground region. The base map 210-*a* and the sensed map 230-*a* may be compared (e.g., by a data processor 190 of the first satellite 105-*a* or other remote sensing system) in a difference determination 240-*a* to generate a difference map 250-*a*. The difference map 250-*a* may be an example of difference information representing a difference between the second geographical distribution of information and the first geographical distribution of information. In example 200, since the feature 220-*a* is present in both the base map 210-*a* (e.g., as provided to the remote sensing system) and the sensed map 230-*a* (e.g., as sensed or otherwise determined at the remote sensing system), the difference map 250-*a* may omit the feature 220-*a*, and include indications of the movement of feature 220-*b* (e.g., as a motion vector 260) and the addition of feature 220-*c*.

A remote sensing system may communicate the difference map 250-*a*, which may improve various aspects of communicating the information associated with the sensed map 230-*a*. For example, transmitting information associated with the movement of feature 220-*b* and the addition of feature 220-*c*, and refraining from transmitting information associated with the feature 220-*a*, may be associated with less communications traffic than transmitting information associated with each of the features 220-*a*, 220-*b*, and 220-*c*. Thus, by performing the difference determination 240-*a*, a communications link between the first satellite 105-*a* and the ground segment 110 may be used for other information (e.g., unrelated to the information of the sensed map 230-*a*), or a communications link between the first satellite 105-*a* and the ground segment 110 may be used for transmitting higher-fidelity or higher-resolution information that may be associated with the information of the sensed map 230-*a*.

Figure 3:
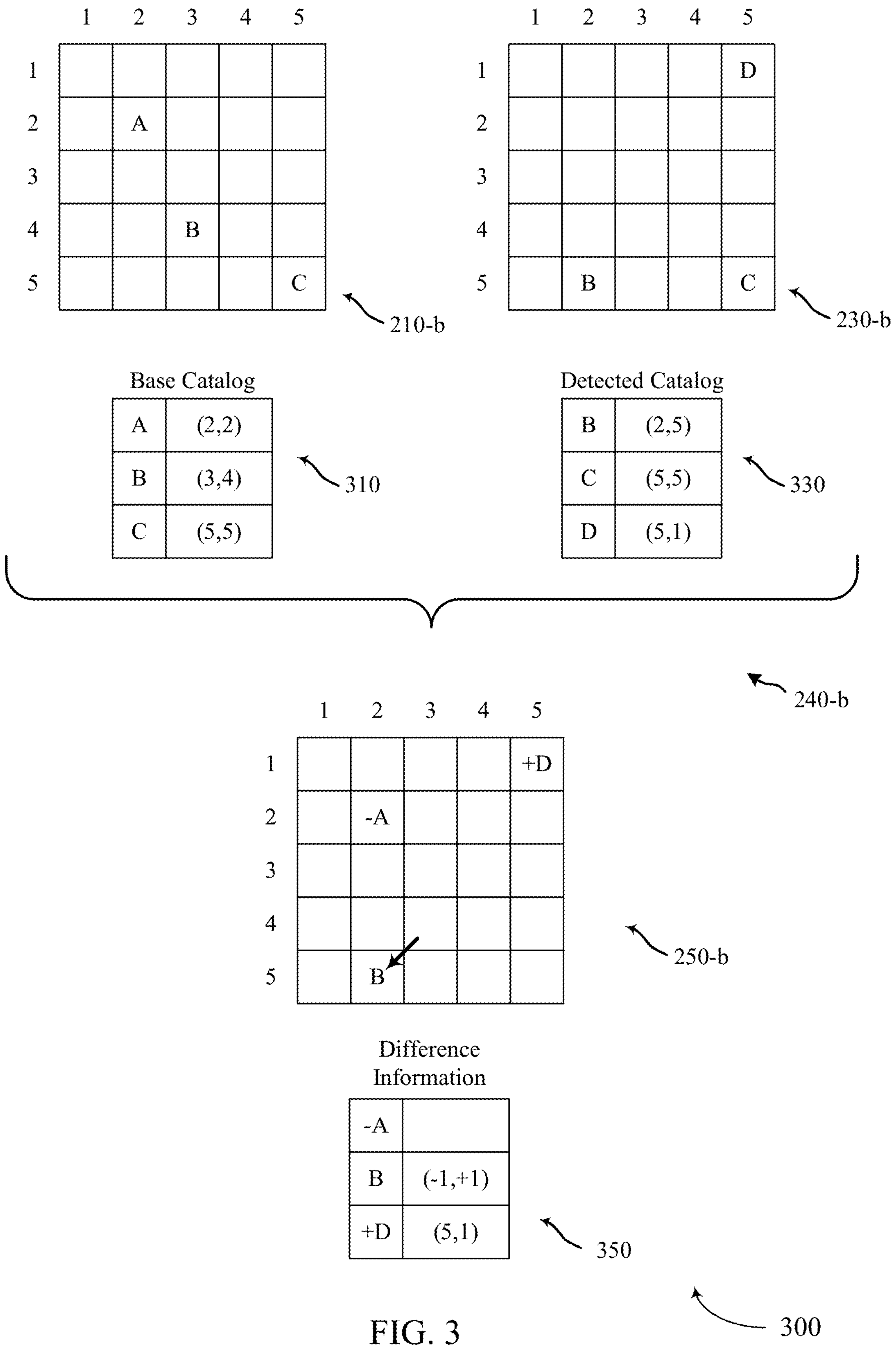

FIG. 3 illustrates an example 300 of a difference determination that supports delta coding for remote sensing in accordance with examples as disclosed herein. In some examples, aspects of the difference determination of example 300 may be performed by a satellite mapping system 170 of a first satellite 105-*a* as described with reference to FIG. 1. In some examples, aspects of the difference determination of example 300 may be performed by a different device or type of device, which may be described more generally as a remote sensing system.

Example 300 includes a base map 210-*b*, including a first geographical distribution of information, which may be received by the first satellite 105-*a* or other remote sensing system and stored (e.g., at data storage 185) for later comparison. The base map 210-*b* may be another example of a baseline condition from which a difference determination may be made (e.g., by a first satellite 105-*a* or other device). The information of the base map 210-*b* may be associated with one or both of a ground position (e.g., a ground-referenced location at or above ground-level) or an overhead position (e.g., a position of an overhead pass above a ground position, a position of an orbital path of the first satellite 105-*a*).

The information of the base map 210-*b* may include information of various types. In some examples, the base map 210-*a* may refer to identified objects, or a grid of positions that satisfy a particular threshold. For example, the base map 210-*b* may include or correspond to a base catalog 310 associated with identified objects (e.g., types of objects, such as vehicles, buildings, or other structures having spatial coordinates) or identified regions or coordinates that otherwise satisfy a threshold (e.g., regions of vegetation, regions having surface water, regions affected by development or natural disaster). In various examples, a first satellite 105-*a* or other remote sensing system may receive the base map 210-*b* and generate the base catalog 310, or a first satellite 105-*a* or other remote sensing system may receive the base catalog 310 in lieu of receiving the base map 210-*b*. Each of the base map 210-*b* or the base catalog 310 may be an example of a catalog or list of information (e.g., a catalog of features, a catalog of identified objects, a catalog of identified locations).

In some examples, the type of information of the base map 210-*b* may correspond to a type of information gathered by a sensor platform. In some examples, the type of information of the base map 210-*b* may represent information that has been processed, filtered, or otherwise converted (e.g., to support the identification of objects or coordinates of a catalog).

The base map 210-*b* or the base catalog 310 may be other examples of a first geographical or spatial distribution of information from which various differences may be determined. For example, the base map 210-*b* or the base catalog 310 may include a first feature, A, a second feature, B, and a third feature, C. The base map 210-*b* or the base catalog 310 may be provided to a first satellite 105-*a* or other remote sensing system and, after sensing another geographical distribution of information (e.g., in a subsequent overhead or orbital pass), or sensing information that can be otherwise converted into another geographical distribution of information, the base map 210-*b* or the base catalog 310 may be used to determine difference information (e.g., at the first satellite 105-*a* or other remote sensing system, by a satellite mapping system 170).

Example 200 also includes a sensed map 230-*b*, which includes a second geographical or spatial distribution of information that is based at least in part on information sensed by the remote sensor system (e.g., sensed by a sensor platform 175 of the first satellite 105-*a* or other remote sensing system). The information of the sensed map 230-*b* may also be associated with one or both of a ground position (e.g., a ground-referenced location at or above ground-level) or an overhead position (e.g., a position of an orbital or otherwise overhead pass above a ground position, a position of the sensor platform during collection of the information used to generate the sensed map 230-*b*). The ground position of the sensed map 230-*b* may generally correspond to the same ground position as the base map 210-*b*. However, the overhead position associated with the sensed map 230-*b* may be the same as the overhead position associated with the base map 210-*b* or may be different than the overhead position associated with the base map 210-*b*. The sensed map 230-*b* may include or be otherwise associated with a sensed catalog 330, which may be determined (e.g., by a data processor 190) by the first satellite 105-*a*, or other remote sensing system, either directly or based at least in part on the sensed map 230-*b*.

In example 200, the sensed map 230-*b* does not include feature A, includes a different position of feature B, includes feature C in a same position, and includes a new feature D that was not included in the base map 210-*b* or the base catalog 310. Accordingly, aspects related to features A, B, and D of the sensed map 230-*b* or sensed catalog 330 may be illustrative of a change in a geographical or spatial distribution of information for a given ground position or ground region. The base map 210-*b* and the sensed map 230-*b*, or the base catalog 310 and the sensed catalog 330, may be compared (e.g., by a data processor 190 of the first satellite 105-*a* or other remote sensing system) in a difference determination 240-*b* to generate one or both of a difference map 250-*a* or a difference catalog 350. Either of the difference map 250-*b* or the difference catalog 350 may be an example of difference information representing a difference between the second geographical distribution of information and the first geographical distribution of information.

A remote sensing system may communicate one or both of the difference map 250-*b* or the difference catalog 350, which may improve various aspects of communicating the information associated with the sensed map 230-*b* or sensed catalog 330. For example, transmitting the information of the difference map 250-*b* or the difference catalog 350 may be associated with less communications traffic than transmitting the entirety of sensed map 230-*b* or sensed catalog 330. Thus, by performing one or more aspects of the difference determination 240-*b*, a communications link between the first satellite 105-*a* and the ground segment 110 may be used for other information (e.g., unrelated to the information of the sensed map 230-*b*), or a communications link between the first satellite 105-*a* and the ground segment 110 may be used for transmitting higher-fidelity or higher-resolution information that may be associated with the information of the sensed map 230-*b*.

Figure 4:
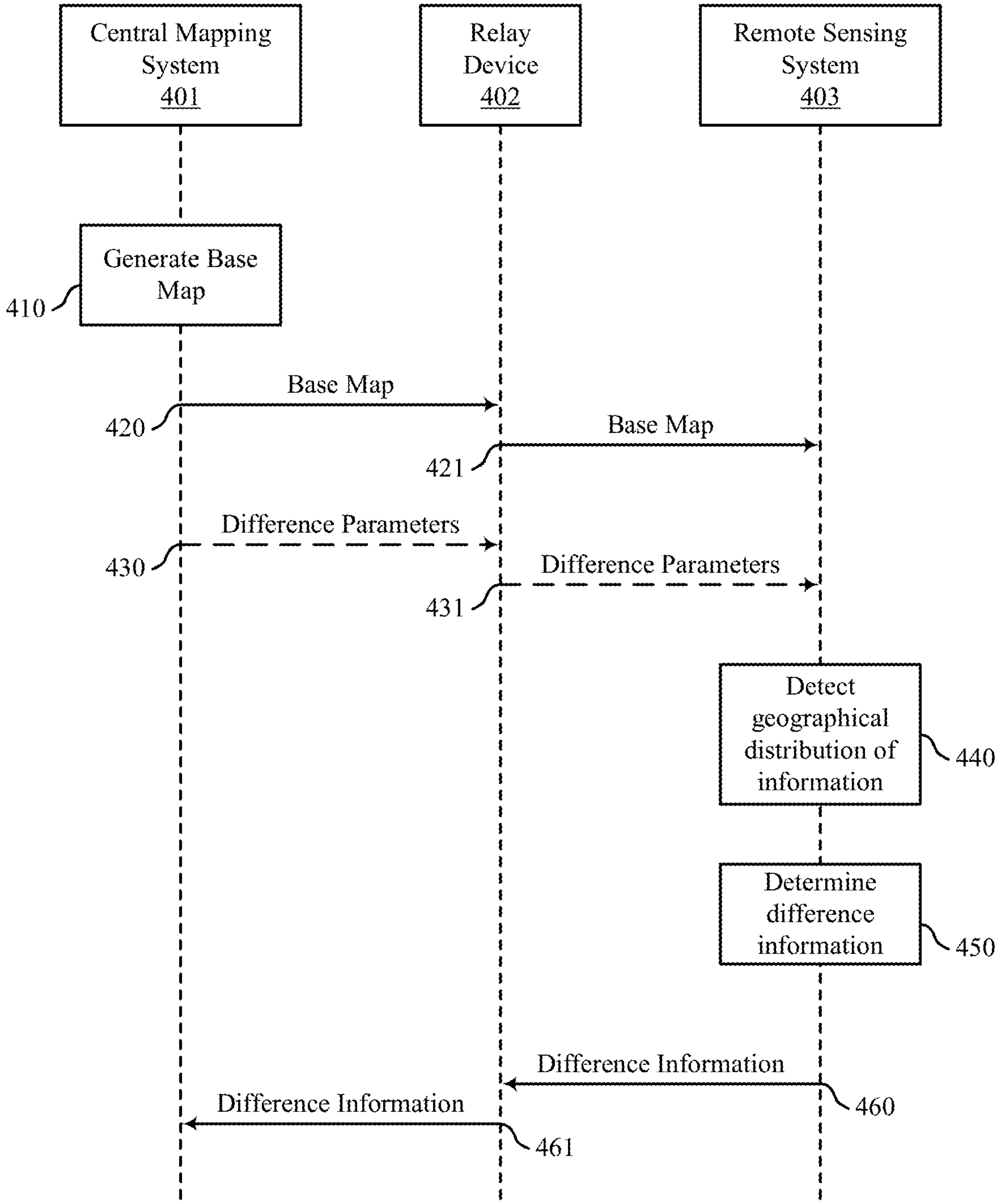
FIG. 4 illustrates an example of a system and corresponding operations that support delta coding for remote sensing in accordance with examples as disclosed herein.

FIG. 4 illustrates an example of a system 400 and corresponding operations that support delta coding for remote sensing in accordance with examples as disclosed herein. The system includes a central mapping system 401, a relay device 402, and a remote sensing system 403. In one example, the system 400 may include components of a satellite communications system, such as the satellite communications system 100 described with reference to FIG. 1. For example, the central mapping system 401 may include aspects of a ground segment 110 (e.g., a ground segment mapping system 130), the relay device 402 may include aspects of a second satellite 105-*b* (e.g., a satellite in a geostationary orbit), and the remote sensing system 403 may include aspects of a first satellite 105-*a* (e.g., a LEO or MEO satellite that may include a satellite mapping system 170). In other examples, the system 400 may be illustrative of other components (e.g., where the remote sensing system 403 includes aspects of another type of remote or mobile device, such as a vehicle, a plane, a helicopter, a UAV, or a remote monitoring station). Although the system 400 is illustrated with a single remote sensing system 403, the described techniques may be applied with more than one remote sensing system 403 (e.g., a constellation of remote sensing systems 403).

At 410, the central mapping system 401 may generate a base map or other baseline condition including a first geographical distribution of information. The first geographical distribution of information may include a spatial representation of information (e.g., an image, a spatial plot), or a catalog of information (e.g., a catalog of features), and may correspond to a first position (e.g., an overhead or orbital position of the remote sensing system 403, a ground or ground-referenced location of the base map). In some examples, the generation of a first geographical distribution of information may include aspects of generating a base map 210 or a base catalog 310 as described with reference to FIGS. 2 and 3. The generation of a base map at 410 may be based on information sensed by the remote sensing system 403 (e.g., prior data that was previously transmitted to the central mapping system 401), other remote sensing systems 403 (e.g., of a constellation of remote sensing systems 403), or other sources of information or combinations thereof (e.g., for an aggregated base map), which may include respective adaptations to normalize one or more sets of sensed information relative to the first position.

At 420, the central mapping system 401 may transmit the generated base map or other baseline condition. In the illustrated example, a base map may be transmitted to the relay device 402 and, at 421, the base map may be transmitted by the relay device 402 to the remote sensing system 403. In other examples, a base map or other baseline condition may be transmitted (e.g., at 420) to the remote sensing system 403 without being relayed by a relay device 402.

In some examples, the central mapping system 401 may determine various parameters or algorithms to be used for detecting or identifying differences from the base map or other baseline condition. For example, the central mapping system 401 may be configured for detecting natural disasters (e.g., fire zones, earthquake damage), changes to infrastructure (e.g., construction of new buildings or roads, demolition of structures), movement of vehicles (e.g., presence of vehicles, absence of vehicles, changes of positions of vehicles), or other detections. In some examples, a change of difference detection configuration may coincide with a retasking or deployment (e.g., of or via a ground segment 110) of a satellite 105 or other remote sensing system (e.g., UAV) to observe a given geographical region.

In examples where the remote sensing system 403 is to be configured for a particular difference detection, at 430, the central mapping system 401 may transmit difference parameters associated with the difference detection or configuration thereof. In the illustrated example, difference parameters may be transmitted to the relay device 402 and, at 431, the difference parameters may be transmitted by the relay device 402 to the remote sensing system 403. In other examples (e.g., whether or not the base map was communicated via a relay device 402), the difference parameters may be transmitted (e.g., at 430) to the remote sensing system 403 without being relayed by the relay device 402.

At 440, the remote sensing system 403 may detect a geographical distribution of information. For example, the remote sensing system 403 may detect various information (e.g., via a sensor platform 175) to support generating a sensed map 230 or a sensed catalog 330 as described with reference to FIGS. 2 and 3. In some examples, the detecting may correspond to same position as the base map (e.g., a same overhead position, a same ground or ground-referenced location of the base map). In some examples, the detecting of 440 may correspond to a different overhead position than the base map, but the remote sensing system 403 may process sensed information (e.g., based on an elevation model an associated geographical region, based on a skew or perspective angle or orientation between an overhead position and a ground position) to support a comparison with the base map. Although the detecting of 440 is illustrated as being after the remote sensing system 403 receives the base map, and optionally receives difference parameters, in some examples, the remote sensing system 403 may perform the detections of 440 before receiving a base map or before receiving difference parameters.

At 450 the remote sensing system 403 may determine difference information (e.g., based at least in part on the base map transmitted at 420 and the information detected at 440). For example, the remote sensing system 403 may perform one or more aspects of a difference determination 240 as described with reference to FIGS. 2 and 3. In some examples, the operations of 450 may be associated with generating one or both of a difference map 250 or a difference catalog 350 as described with reference to FIGS. 2 and 3. In various examples, the difference information may include differences in spectral or other imaging information, or an addition, deletion, or movement of an identified feature, among other differences.

At 460, the remote sensing system 403 may transmit the difference information determined at 450. In the illustrated example, the difference information may be transmitted to the relay device 402 and, at 461, the difference information may be transmitted by the relay device 402 to the central mapping system 401. In other examples (e.g., whether or not a base map or difference parameters were communicated via a relay device 402), the difference information may be transmitted (e.g., at 460) to the central mapping system 401 without being relayed by the relay device 402. In some examples, the transmitting of 460 may be based at least in part on channel conditions of a communication link, a cost of bandwidth of a communication link, or a quantity of data of the difference information. For example, such transmission may consider a signal-to noise ratio of communications with a relay device, relative costs of communications with different ground-based or relay devices, buffer status (e.g., how much of a buffer capacity of the remote sensing system 403 is being used). In some examples, the transmitting of 460 may be scheduled by the central mapping system 401, the relay device 402, or the remote sensing system 403 based on these and other factors.

The difference information transmitted at 460 may be used by the central mapping system 401 to support various functionality. In some examples, the central mapping system 401 may update a base map based at least in part on the difference information, and an updated base map may be provided to one or more remote sensing systems 403 (e.g., including or different than the remote sensing system 403, a constellation of remote sensing systems 403), or to an end user of a geographical distribution of information. For example, the central mapping system 401 may provide aggregated and processed (e.g., orthorectified) information to an end user. In some examples, the difference information itself may be forwarded to one or more remote sensing systems 403 (e.g., different than the remote sensing system 403, for updating a base map), or to an end user of a geographical distribution of information (e.g., a user of identified differences in a geographical distribution of information). In some examples, difference information may be aggregated from multiple remote sensing systems 403, and difference information or updated base maps may be distributed accordingly.

Although the illustrated example refers to a single base map and determination of difference information, the described techniques may be performed at different locations. For example, the system 400 may be configured to support communicating a second base map (e.g., corresponding to a second overhead or orbital position of the remote sensing system 403) including a third geographical distribution of information. In some examples, the second base map may be communicated while the remote sensing system 403 is located along a path between the first position and the second position (e.g., after preforming the detection of information of 440, prior to another detection of information, within a portion of an orbit between the first orbital position and a second orbital position), or after reaching or passing the second position. The remote sensing system 403 may accordingly be configured to support detecting a fourth geographical distribution of information (e.g., from the second position) and determining second difference information representing a difference between the fourth geographical distribution of information and the third geographical distribution of information. The system 400 may thus be configured for communicating the second difference information (e.g., between the remote sensing system 403 and the central mapping system 401). Generally, the remote sensing system 403 may have a capacity to store some quantity of base maps, which may correspond to multiple locations, up to and including base maps for an entire coverage area (e.g., one or more base maps corresponding to whole-earth coverage). In some examples, the remote sensing system 403 may receive only updated base maps for regions for which the base map is updated since the last pass.

Although the system 400 illustrates one example for supporting the described techniques for delta coding, other systems may perform operations in a different manner, or distribute operations among different components. In one example, a remote sensing system 403 may be configured for transmitting sensed information (e.g., in its entirety) to a relay device 402, and the relay device 402 may be configured for determining difference information between a base map and the sensed information received from the remote sensing system 403. Thus the relay device 402 may transmit the difference information determined at the relay device 402, which may include a transmission similar to the transmission of 461.

In another example, a base map may not be transmitted by the central mapping system 401, but other operations of the system 400 may still be supported. For example, the remote sensing system 403 may generate its own base map or other baseline condition, and still determine difference information to be transmitted (e.g., to the relay device 402, to the relay device 402). In some examples, the relay device 402 may be configured for determining a base map or other baseline condition (e.g., when the relay device 402 is also an example of a remote sensing system 403), which may be transmitted to the remote sensing system 403 (e.g., similar to the transmission of 421).

In some examples (e.g., when the relay device 402 is an example of a remote sensing system 403, or receives difference information from more than one remote sensing system 403), the relay device 402 may aggregate difference information, which may support an aggregated difference information transmission to the central mapping system 401, or a relaying of difference information among a network of remote sensing systems 403 (e.g., for distributed updating of base maps), or an updating (e.g., at the relay device 402) of a base map according to an aggregation of difference information, which may accordingly be updated to various remote sensing systems 403.

Figure 5:
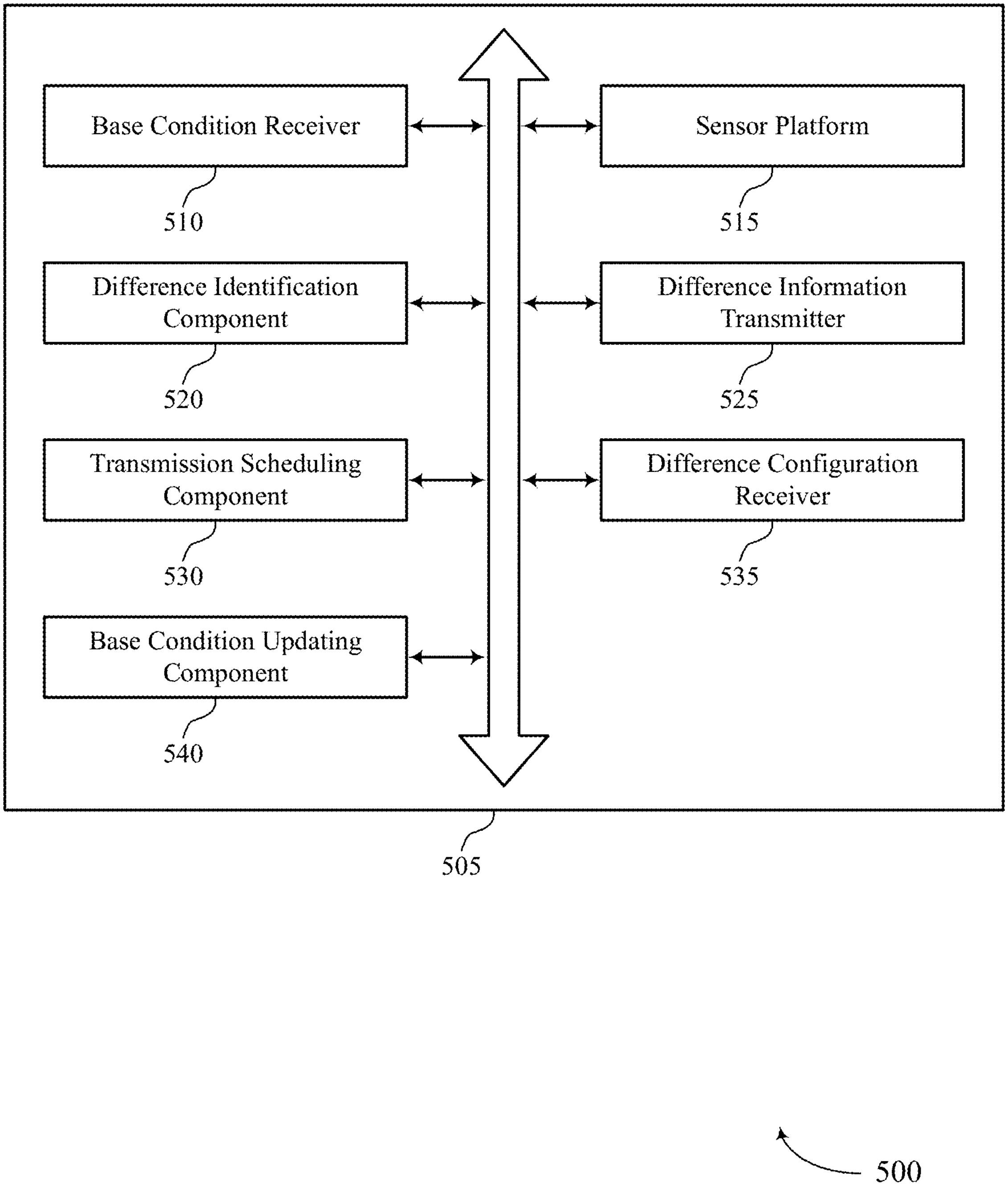
FIG. 5 shows a block diagram of a remote sensing system that supports delta coding for remote sensing in accordance with aspects of the present disclosure.

FIG. 5 shows a block diagram 500 of a remote sensing system 505 that supports delta coding for remote sensing in accordance with examples as disclosed herein. The remote sensing system 505 may be an example of aspects of a remote sensing system as described with reference to FIGS. 1 through 4 (e.g., a first satellite 105-*a*, a remote sensing system 403). The remote sensing system 505 may include a base condition receiver 510, a sensor platform 515, a difference identification component 520, a difference information transmitter 525, a transmission scheduling component 530, a difference configuration receiver 535, and a base condition updating component 540. Each of these modules may communicate, directly or indirectly, with one another (e.g., via one or more buses). In some examples, the remote sensing system 505 may be a satellite, or included in a satellite (e.g., a satellite 105 as described with reference to FIG. 1). In some cases, the remote sensing system 505 may be or may be included in a LEO or MEO satellite. In some examples, the remote sensing system 505 may be included in another type of vehicle (e.g., a mobile vehicle, a plane, a helicopter, a UAV).

The base condition receiver 510 may receive a base map including a first geographical distribution of information. In some examples, the first geographical distribution of information may correspond to a first position of the remote sensing system 505. In some examples, the base condition receiver 510 may receive a base map from a central mapping system (e.g., a ground segment 110, a ground station, a central mapping system 401) via a relay device (e.g., a relay satellite). In some examples, the relay device may be a relay satellite that is in a geostationary orbit.

In some examples, the base condition receiver 510 may receive a second base map corresponding to a second position, the second base map including third geographical distribution of information corresponding to a second position of the remote sensing system. In some examples, receiving a second base map occurs within a portion of an orbit of a satellite between a first orbital position and a second orbital position.

The sensor platform 515 may detect a geographical distribution of information. In some examples, the sensor platform 515 may detect different geographical distributions of information from different positions of the remote sensing system 505. In some cases, the sensor platform 515 includes a visible spectrum imaging device, an infra-red imaging device, a hyperspectral imaging device, a synthetic aperture radar, or a combination thereof.

The difference identification component 520 may determine difference information representing a difference between a detected (e.g., second) geographical distribution of information and a geographical distribution of information of a base map or other baseline condition (e.g., a first geographical distribution of information). In some examples, the difference identification component 520 may identify one or more additional objects in the detected geographical distribution of information that are not in a received geographical distribution of information, or movement of one or more objects between a received geographical distribution of information and a detected geographical distribution of information. In some examples, the difference identification component 520 may determine different difference information corresponding to different positions of the remote sensing system 505.

The difference information transmitter 525 may transmit difference information. In some examples, the difference information transmitter 525 may transmit the difference information to a central mapping system (e.g., a ground segment 110, a ground station, a central mapping system 401). In some examples, the difference information transmitter 525 may transmit the difference information to another device (e.g., a relay device, a relay satellite) for relay to a central mapping system 401.

The transmission scheduling component 530 may determine scheduling for transmitting difference information based on channel conditions of the communication link, a cost of bandwidth of the communication link, or a quantity of data of the difference information.

The difference configuration receiver 535 may receive (e.g., from a central mapping system 401, from a ground segment 110, from a ground station) one or more parameters for determining difference information.

The base condition updating component 540 may receive information representing a difference between the geographical distribution of information of a base map and another geographical distribution of information. In some examples, the base condition updating component 540 may generate an updated base map based on the information.

Figure 6:
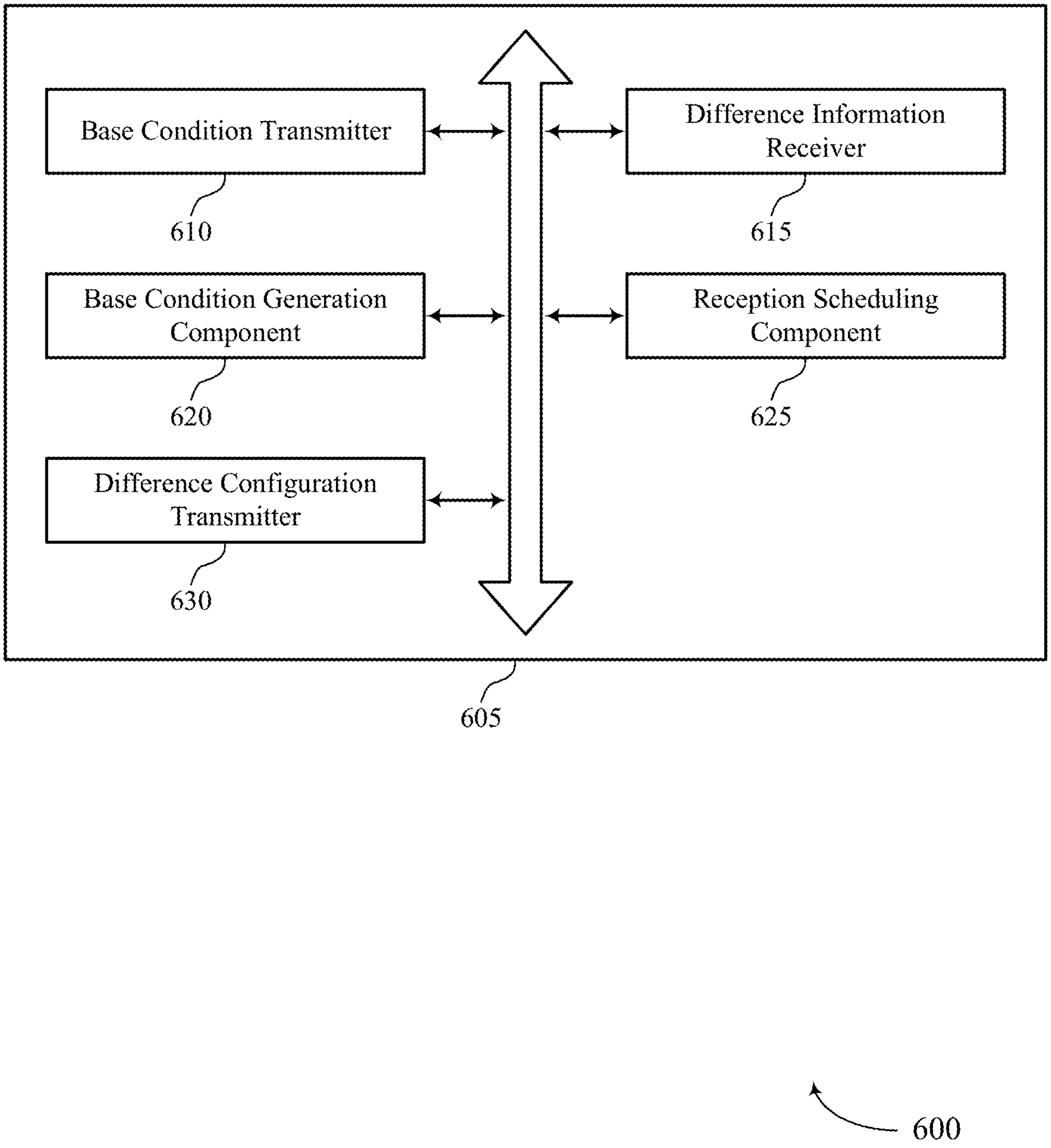
FIG. 6 shows a block diagram of a central mapping system that supports delta coding for remote sensing in accordance with aspects of the present disclosure.

FIG. 6 shows a block diagram 600 of a central mapping system 605 that supports delta coding for remote sensing in accordance with examples as disclosed herein. The central mapping system 605 may be an example of aspects of a central mapping system as described with reference to FIGS. 1 through 4 (e.g., a ground segment mapping system 130, a central mapping system 401). The central mapping system 605 may include a base condition transmitter 610, a difference information receiver 615, a base condition generation component 620, a reception scheduling component 625, and a difference configuration transmitter 630. Each of these modules may communicate, directly or indirectly, with one another (e.g., via one or more buses).

The base condition transmitter 610 may transmit, to a device (e.g., a satellite, a mobile vehicle, a plane, a helicopter, a UAV) having a remote sensing platform, a first base map including a first geographical distribution of information. In some examples, the first base map may correspond to a first position (e.g., a first overhead position, a first orbital position) of the device. In some cases, the remote sensing platform includes a visible spectrum imaging device, an infra-red imaging device, a hyperspectral imaging device, or a combination thereof.

In some examples, the base condition transmitter 610 may transmit the first base map from the central mapping system 605 to the device via another device (e.g., a relay device, a relay satellite). In some cases, the device is a LEO or MEO satellite and the other device is a relay satellite that is in a geostationary orbit.

In some examples, the base condition transmitter 610 may transmit a second base map corresponding to a second position of the device, the second base map including a third geographical distribution of information. In some cases, transmitting the second base map may occur along a path between the first position and the second position (e.g., within a portion of an orbit of a satellite between a first orbital position and a second orbital position).

The difference information receiver 615 may receive a transmission including difference information representing a determined difference between a second geographical distribution of information detected by the remote sensing platform at the first position and the first geographical distribution of information. In some examples, the difference information receiver 615 may receive the transmission via another device (e.g., a relay device, a relay satellite). In some cases, the difference information includes one or more additional objects, one or more omitted objects, and/or one or more moved objects as compared with the first geographical distribution of information.

In some examples, the difference information receiver 615 may receive a transmission including second difference information representing a determined difference between a fourth geographical distribution of information detected by the remote sensing platform at a second position and a third geographical distribution of information.

The base condition generation component 620 may generate the first base map based on one or more images of a geographical region corresponding to the first geographical distribution of information and an elevation model of the geographical region. In some examples, the base condition generation component 620 may modify the one or more images to represent a perspective of the device at the first position based on the elevation model of the geographical region. In some examples, the base condition generation component 620 may modify the one or more images based on a time of day, meteorological information for the geographical region, or a combination thereof.

The reception scheduling component 625 may determine scheduling for receiving the transmission based on channel conditions of the communication link, a cost of bandwidth of the communication link, or a quantity of data of the difference information.

The difference configuration transmitter 630 may transmit, to the device, one or more parameters for determining the difference information.

Figure 7:
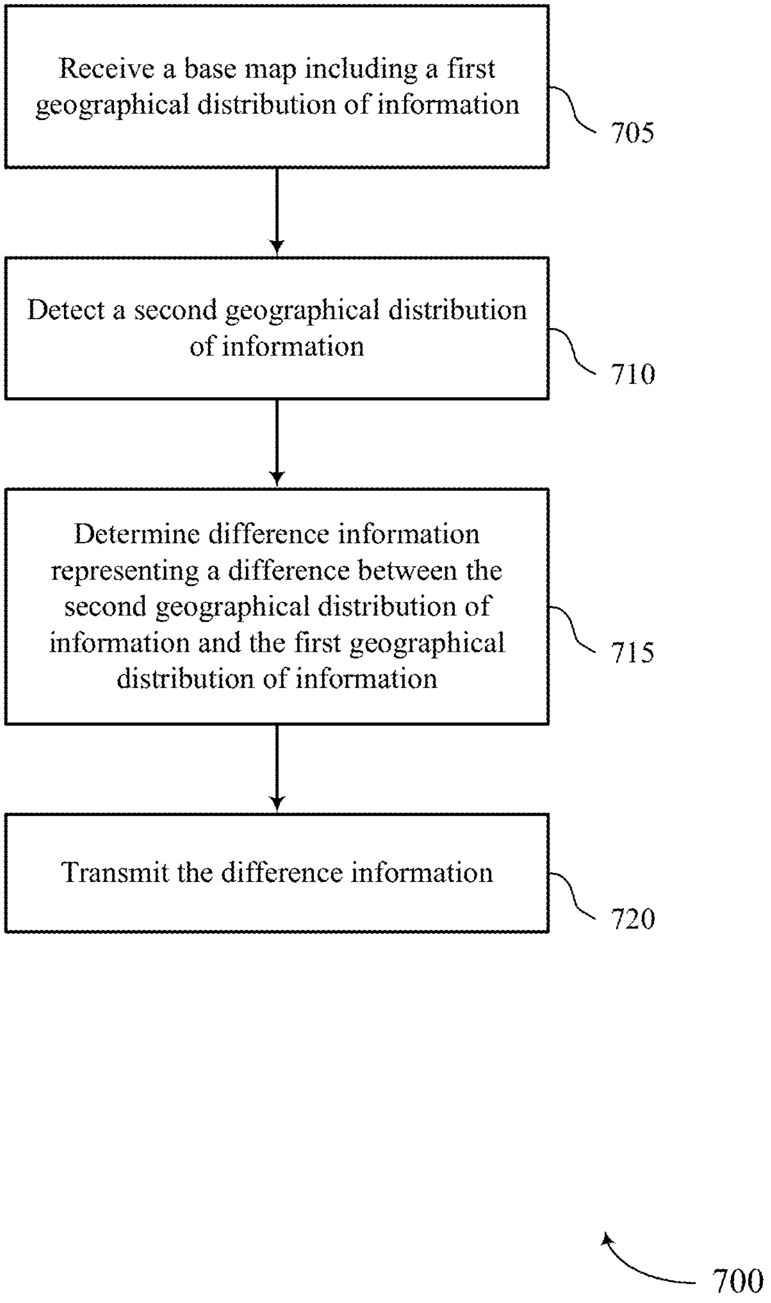
FIGS. 7 and 8 show flowcharts illustrating a method or methods that support delta coding for remote sensing in accordance with examples as disclosed herein.

FIG. 7 shows a flowchart illustrating a method or methods 700 that supports delta coding for remote sensing in accordance with aspects of the present disclosure. The operations of method 700 may be implemented by a remote sensing system or its components as described herein. For example, the operations of method 700 may be performed by a remote sensing system as described with reference to FIGS. 4 and 5. In some examples, the operations of method 700 may be performed by components of a satellite having a remote sensing platform, such as a satellite 105 described with reference to FIG. 1. In some examples, a remote sensing system may execute a set of instructions to control the functional elements of the remote sensing system to perform the described functions. Additionally or alternatively, a remote sensing system may perform aspects of the described functions using special-purpose hardware.

At 705, the method 700 may include receiving a base map including a first geographical distribution of information. In some examples, aspects of the operations of 705 may be performed by a base condition receiver as described with reference to FIG. 5.

At 710, the method 700 may include detecting (e.g., using a remote sensing platform) a second geographical distribution of information. In some examples, aspects of the operations of 710 may be performed by a sensor platform as described with reference to FIG. 5.

At 715, the method 700 may include determining difference information representing a difference between the second geographical distribution of information and the first geographical distribution of information. In some examples, aspects of the operations of 715 may be performed by a difference identification component as described with reference to FIG. 5.

At 720, the method 700 may include transmitting the difference information. In some examples, aspects of the operations of 720 may be performed by a difference information transmitter as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for receiving (e.g., by a device, such as a satellite, having a remote sensing platform) a base map including a first geographical distribution of information, detecting a second geographical distribution of information, determining difference information representing a difference between the second geographical distribution of information and the first geographical distribution of information, and transmitting (e.g., via a communications link, to a central mapping system) the difference information.

In some examples, of the method 700 and the apparatus described herein, transmitting the difference information may include operations, features, means, or instructions for transmitting the difference information to a ground station via a communication link (e.g., by a satellite).

In some examples of the method 700 and the apparatus described herein, transmitting the difference information may include operations, features, means, or instructions to transmit the difference information to another device (e.g., a relay device, a relay satellite) for relay to a central mapping system (e.g., a ground station).

In some examples of the method 700 and the apparatus described herein, receiving the base map may include operations, features, means, or instructions for receiving the base map from a ground station via another device (e.g., a relay device, a relay satellite).

In some examples of the method 700 and the apparatus described herein, the device may be a first satellite that is in a low earth orbit and the other device may be a relay satellite in a geostationary orbit.

Some examples of the method 700 and the apparatus described herein may further include operations, features, means, or instructions for determining scheduling for transmitting the difference information based on channel conditions of the communication link, a cost of bandwidth of the communication link, or a quantity of data of the difference information.

Some examples of the method 700 and the apparatus described herein may further include operations, features, means, or instructions for receiving (e.g., from a central mapping system, from a ground station) one or more parameters for determining the difference information.

In some examples of the method 700 and the apparatus described herein, the remote sensing platform includes a visible spectrum imaging device, an infra-red imaging device, a hyperspectral imaging device, a synthetic aperture radar, or a combination thereof.

Some examples of the method 700 and the apparatus described herein may include operations, features, means, or instructions for identifying one or more additional objects in the second geographical distribution of information that are not in the first geographical distribution of information, or movement of one or more objects between the first geographical distribution of information and the second geographical distribution of information.

In some examples of the method 700 and the apparatus described herein, the base map may include a first base map corresponding to a first position, and the method or apparatus may include operations, features, means, or instructions for receiving a second base map corresponding to a second position, the second base map including a third geographical distribution of information, detecting a fourth geographical distribution of information from the second position, determining second difference information representing a difference between the fourth geographical distribution of information and the third geographical distribution of information, and transmitting the second difference information.

In some examples of the method 700 and the apparatus described herein, receiving the second base map may occur along a path between the first position and the second position (e.g., within a portion of an orbit of a satellite between a first orbital position and a second orbital position).

Some examples of the method 700 and the apparatus described herein may further include operations, features, means, or instructions for receiving information (e.g., difference information) representing a difference between the first geographical distribution of information and a fifth geographical distribution of information, and generating an updated base map based on the information.

Figure 8:
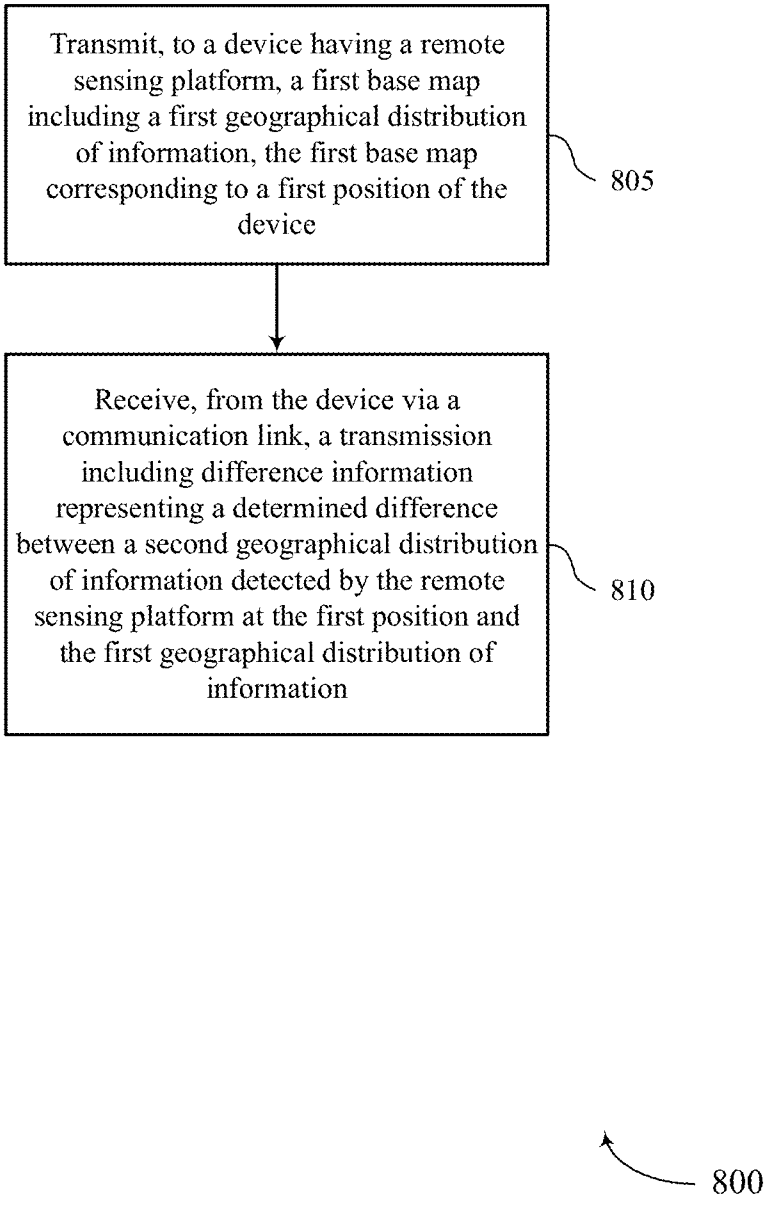

FIG. 8 shows a flowchart illustrating a method or methods 800 that supports delta coding for remote sensing in accordance with examples as disclosed herein. The operations of method 800 may be implemented by a central mapping system or its components as described herein. For example, the operations of method 800 may be performed by a central mapping system as described with reference to FIGS. 4 and 6. In some examples, the operations of method 800 may be performed by components of a ground segment 110, such as a ground segment mapping system 130 described with reference to FIG. 1. In some examples, a central mapping system may execute a set of instructions to control the functional elements of the central mapping system to perform the described functions. Additionally or alternatively, a central mapping system may perform aspects of the described functions using special-purpose hardware.

At 805, the method 800 may include transmitting, to a device (e.g., a satellite) having a remote sensing platform, a first base map including a first geographical distribution of information, the first base map corresponding to a first position (e.g., overhead position, orbital position) of the device. In some examples, aspects of the operations of 805 may be performed by a base condition transmitter as described with reference to FIG. 6.

At 810, the method 800 may include receiving, from the device via a communication link (e.g., a wireless communications link), a transmission including difference information representing a determined difference between a second geographical distribution of information detected by the remote sensing platform at the first position and the first geographical distribution of information. In some examples, aspects of the operations of 810 may be performed by a difference information receiver as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for transmitting, to a device having a remote sensing platform, a first base map including a first geographical distribution of information, the first base map corresponding to a first position of the device and receiving, from the device via a communication link, a transmission including difference information representing a determined difference between a second geographical distribution of information detected by the remote sensing platform at the first position and the first geographical distribution of information.

In some examples of the method 800 and the apparatus described herein, receiving the transmission may include operations, features, means, or instructions for receiving the transmission at a ground station providing the communication link for the device via another device (e.g., a relay device, a relay satellite).

In some examples of the method 800 and the apparatus described herein, transmitting the first base map may include operations, features, means, or instructions for transmitting the first base map from a ground station to the device via another device (e.g., a relay device, a relay satellite).

In some examples of the method 800 and the apparatus described herein, the device may be a first satellite in a low earth orbit and the other device may be a second satellite in a geostationary orbit.

Some examples of the method 800 and the apparatus described herein may further include operations, features, means, or instructions for generating the first base map based on one or more images of a geographical region corresponding to the first geographical distribution of information and an elevation model of the geographical region.

In some examples of the method 800 and the apparatus described herein, generating the first base map may include operations, features, means, or instructions for modifying the one or more images to represent a perspective of the device at the first position based on the elevation model of the geographical region.

In some examples of the method 800 and the apparatus described herein, generating the first base map may include operations, features, means, or instructions for modifying the one or more images based on a time of day, meteorological information for the geographical region, or a combination thereof.

Some examples of the method 800 and the apparatus described herein may further include operations, features, means, or instructions for determining scheduling for receiving the transmission based on channel conditions of the communication link, a cost of bandwidth of the communication link, or a quantity of data of the difference information.

Some examples of the method 800 and the apparatus described herein may further include operations, features, means, or instructions for transmitting, to the device, one or more parameters for determining the difference information.

In some examples of the method 800 and the apparatus described herein, the remote sensing platform includes a visible spectrum imaging device, an infra-red imaging device, a hyperspectral imaging device, or a combination thereof.

In some examples of the method 800 and the apparatus described herein, the first base map includes one or more identified objects of the first geographical distribution of information and the difference information includes one or more additional objects in the second geographical distribution of information that are not in the first geographical distribution of information.

Some examples of the method 800 and the apparatus described herein may further include operations, features, means, or instructions for transmitting, to the device via the communication link, a second base map corresponding to a second position (e.g., a second orbital position) of the device, the second base map including a third geographical distribution of information, and receiving, from the device via the communication link, a second transmission including second difference information representing a determined difference between a fourth geographical distribution of information detected by the remote sensing platform at the second position and the third geographical distribution of information.

In some examples of the method 800 and the apparatus described herein, the transmitting the second base map occurs at a position along a path between the first position and the second position (e.g., within a portion of an orbital path of the device between the first position and the second position).

An apparatus is described. The apparatus may include a transmitter, a receiver, a sensing platform, a processor, memory coupled with the processor, and instructions stored in the memory. The instructions may be executable by the processor to receive, via the receiver, a base map including a first geographical distribution of information; detect, using the sensing platform, a second geographical distribution of information; determine difference information representing a difference between the second geographical distribution of information and the first geographical distribution of information; and transmit, using the transmitter, the difference information to a ground station. In some examples, the apparatus may be a satellite.

It should be noted that the methods described herein are possible implementations, and that the operations or components may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A satellite, comprising:

a transmitter;

a receiver;

a sensing platform;

one or more processors;

memory coupled with the one or more processors; and instructions stored in the memory and executable by the one or more processors to cause the satellite to:

receive, using the receiver, a base map comprising a first geographical distribution of information, wherein the base map comprises one or more identified objects of the first geographical distribution of information;

detect, using the sensing platform, a second geographical distribution of information;

determine difference information representing a difference between the second geographical distribution of information and the first geographical distribution of information, wherein determining the difference information comprises identifying one or more additional objects in the second geographical distribution of information that are not in the first geographical distribution of information, or identifying movement of one or more of the identified objects between the first geographical distribution of information and the second geographical distribution of information, or identifying that one or more of the identified objects are not in the second geographical distribution of information, or a combination thereof; and transmit, using the transmitter, the difference information.

2. The satellite of claim 1, wherein the instructions to transmit the difference information are executable by the one or more processors to cause the satellite to:

transmit the difference information to a ground segment.

3. The satellite of claim 1, wherein the instructions to transmit the difference information are executable by the one or more processors to cause the satellite to:
transmit the difference information to a second satellite.

4. The satellite of claim 1, wherein the instructions to transmit the difference information are executable by the one or more processors to cause the satellite to:
transmit the difference information to a second satellite for relay by the second satellite to a ground segment.

5. The satellite of claim 4, wherein the instructions to receive the base map are executable by the one or more processors to cause the satellite to:
receive the base map from the ground segment via the second satellite.

6. The satellite of claim 4, wherein the instructions to transmit the difference information are executable by the one or more processors to cause the satellite to:
transmit the difference information while the satellite is in a low earth orbit and the second satellite is in a geostationary orbit.

7. The satellite of claim 1, wherein the base map comprises a first base map corresponding to a first orbital position of the satellite, and the instructions are further executable by the one or more processors to cause the satellite to:
receive, using the receiver, a second base map corresponding to a second orbital position of the satellite, the second base map comprising a third geographical distribution of information;
detect, using the sensing platform, a fourth geographical distribution of information from the second orbital position;
determine second difference information representing a difference between the fourth geographical distribution of information and the third geographical distribution of information; and
transmit, using the transmitter, the second difference information.

8. The satellite of claim 7, wherein the instructions are executable by the one or more processors to cause the satellite to:
receive the second base map within a portion of an orbit of the satellite between the first orbital position and the second orbital position.

9. The satellite of claim 1, wherein the sensing platform comprises a visible spectrum imaging device, an infra-red imaging device, a hyperspectral imaging device, a synthetic aperture radar, or a combination thereof.

10. The satellite of claim 1, wherein the instructions are further executable by the one or more processors to cause the satellite to:
determine scheduling for the transmitting of the difference information based at least in part on channel conditions of a communication link.

11. The satellite of claim 1, wherein the instructions are further executable by the one or more processors to cause the satellite to:
determine scheduling for the transmitting of the difference information based at least in part on a cost of bandwidth of a communication link.

12. The satellite of claim 1, wherein the instructions are further executable by the one or more processors to cause the satellite to:
determine scheduling for the transmitting of the difference information based at least in part on a quantity of data of the difference information.

13. The satellite of claim 1, wherein the instructions are further executable by the one or more processors to cause the satellite to:
determine scheduling for the transmitting of the difference information based at least in part on a priority of differences of the difference information.

14. The satellite of claim 1, wherein the instructions are further executable by the one or more processors to cause the satellite to:
receive scheduling information for the transmitting of the difference information.

15. The satellite of claim 1, wherein the instructions are further executable by the one or more processors to cause the satellite to:
receive one or more parameters for determining the difference information.

16. The satellite of claim 1, wherein the instructions are further executable by the one or more processors to cause the satellite to:
receive second difference information representing a difference between the first geographical distribution of information and a fifth geographical distribution of information; and
generate an updated base map based at least in part on the second difference information.

17. The satellite of claim 16, wherein the instructions are further executable by the one or more processors to cause the satellite to:
store the updated base map in the memory.

18. The satellite of claim 1, wherein the instructions are further executable by the one or more processors to cause the satellite to:
generate an updated base map based at least in part on detecting the second geographical distribution of information; and
store the updated base map in the memory.

* * * * *